July 27, 1965 A. L. NIXON 3,197,743

DATA COUPLING DEVICE

Filed June 7, 1962 4 Sheets-Sheet 1

INVENTOR
Albert L. Nixon
BY
ATTORNEY

July 27, 1965 A. L. NIXON 3,197,743

DATA COUPLING DEVICE

Filed June 7, 1962 4 Sheets-Sheet 2

INVENTOR.
Albert L. Nixon
BY
ATTORNEY

July 27, 1965 A. L. NIXON 3,197,743

DATA COUPLING DEVICE

Filed June 7, 1962 4 Sheets-Sheet 3

INVENTOR.

Albert L. Nixon

BY

ATTORNEY

July 27, 1965 | A. L. NIXON | 3,197,743

DATA COUPLING DEVICE

Filed June 7, 1962 | 4 Sheets-Sheet 4

INVENTOR
Albert L. Nixon
BY
[signature]
ATTORNEY

United States Patent Office 3,197,743

Patented July 27, 1965

3,197,743

DATA COUPLING DEVICE

Albert L. Nixon, Chamblee, Ga., assignor to Data Machines, Inc., Richmond, Va., a corporation of Virginia Filed June 7, 1962, Ser. No. 200,851
10 Claims. (Cl. 340—172.5)

This invention relates to a data coupling device and is more particularly concerned with a combination adding machine and card punching machine wherein the input to the adding machine is automatically transferred by a data coupler to a card punching machine and transcribed by the card punching machine onto cards therein.

In the past, machines have been devised which will transfer the input of an adding machine to a card punching machine; however, these prior art machines have been expensive, difficult to program and operate properly. The prior art machines usually include a plug board for the programming circuits which a skilled technicial must program properly before the machine will function.

When programmed properly, a less skilled operator may carry out the mechanical manipulations on the adding machine of the prior art device; however, the machine itself does not give an indication of "error," and hence inaccurate cards may be inadvertently punched. Furthermore, even if the operator realizes that an error has been made, the erroneous card is not immediately avaialble and considerable time and effort must be expended to repunch the card and remove the defective card when it becomes available.

At times, the circuitry of prior art devices may not operate properly. Under such circumstances a rather detailed check of each major component must be undertaken in order to identify what portion of which component is not functioning properly.

Briefly, the device of the present invention, which overcomes the difficulties described above, includes three major components; namely, a wired adding machine (sometimes termed a keypunch), and a coupler wired between the two. In the coupler are a plurality of relays and switches which permit the transfer of signals from the adder to the keypunch, so long as the coupler has been programmed for the operation which the adding machine is performing. Otherwise, the coupler gives an indication that an error has occurred and will lock the adder and keypunch until proper steps have been taken to correct the error. The coupler also has mechanism whereby the keypunch is caused to transfer or duplicate data from one card to a subsequent car, to tag an erroneous card for automatic rejection and to release a card at any stage of the punching operation.

Programming of the machine of the present invention is readily and easily accomplished through the manipulation of manual switches readily available on the coupler and the installation of suitable programming cards in the keypunch. The condition of the machine of the present invention is also visually indicated by means of suitable lights on the coupler.

Accordingly, it is an object of the present invention to provide a relatively simple data coupler which may be easily and inexpensive installed between an adding machine and a card punching machine in order to transfer signals from the adding machine to the card punching machine whereby the card punching machine transcribes the input to the adding machine, onto successive cards within the card punching machine according to a predetermined program.

Another object of the present invention is to provide a combination adding and keypunch machine which is inexpensive to manufacture, durable in structure and efficient in operation.

Another object of the present invention is to provide a combination adding and keypunch machine which is quickly and easily programmed and reprogrammed, and will give a visual indication of the program which is set up therein.

Another object of the present invention is to provide an adding machine-keypunch, data coupler which will provide visual indication of when the adding machine to which it is coupled is not being operated in accordance with the prescribed program and will automatically lock the adding machine and the keypunch for subsequent operation.

Another object of the present invention is to provide a combination adding and keypunch machine in which the operator may readily and easily duplicate cards or fields in a card and wherein a field of card may be skipped when desired.

Another object of the present invention is to provide a combination adding and keypunch machine wherein a negative number may be indicated in any column of a card punched thereby and wherein an error code may be punched into a selected card in the event the card was erroneously punched, the card being readily and easily detected thereafter and wherein the correct data on the erroneous card may be automatically transferred to a subsequent card.

Another object of the present invention is to provide a combination adding and keypunch machine which may be programmed and operated by a relatively unskilled operator.

Other objects, features and advantages of the present invention will become apparent from the following description when taken in conjunction with the accompanying drawing wherein like characters of reference designate corresponding parts throughout the several views and wherein.

Figure 1:
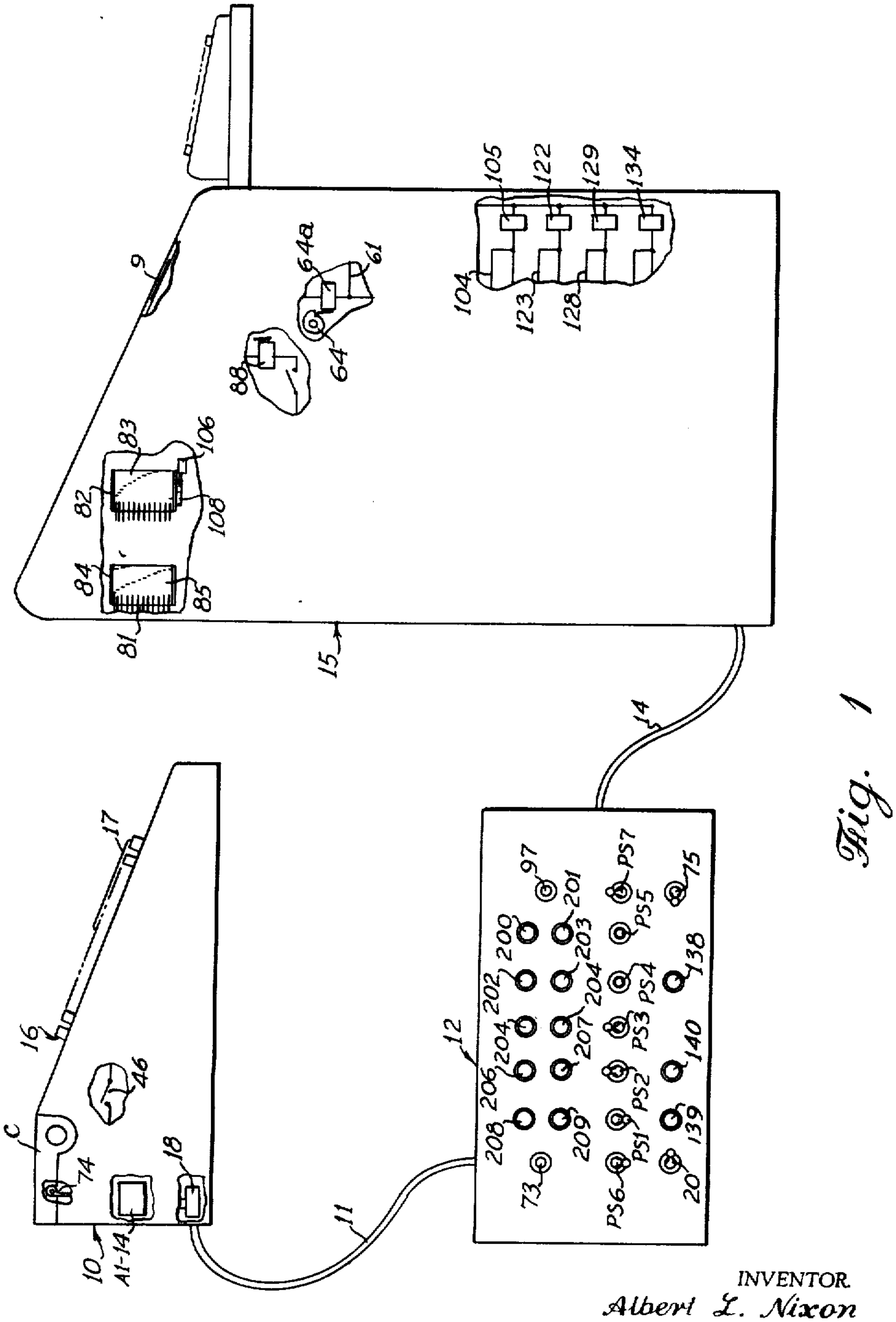
FIG. 1 is a side elevational view, partially broken away, of a machine constructed in accordance with the present invention, the machine including a conventional adder, a conventional keypunch coupled together by the data coupler.
Figures 3A, 3B:
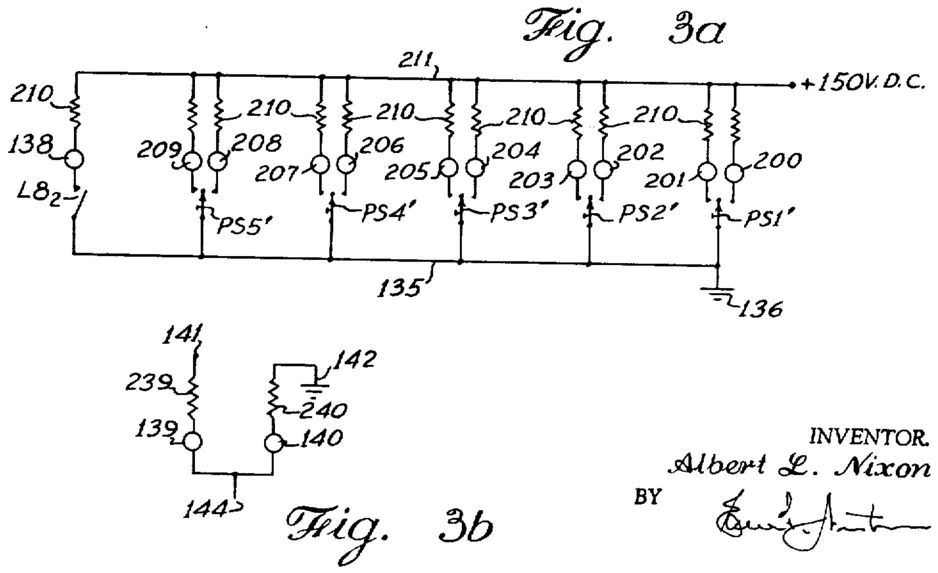

FIG. 3*a* is a schematic wiring diagram showing a portion of the circuits of the program indicator lights of the data coupler shown in FIG. 1.

FIG. 3*b* is a schematic wiring digram showing a portion of the circuits of the punch function indicator lights of the data coupler shown in FIG. 1.

Figure 4A:
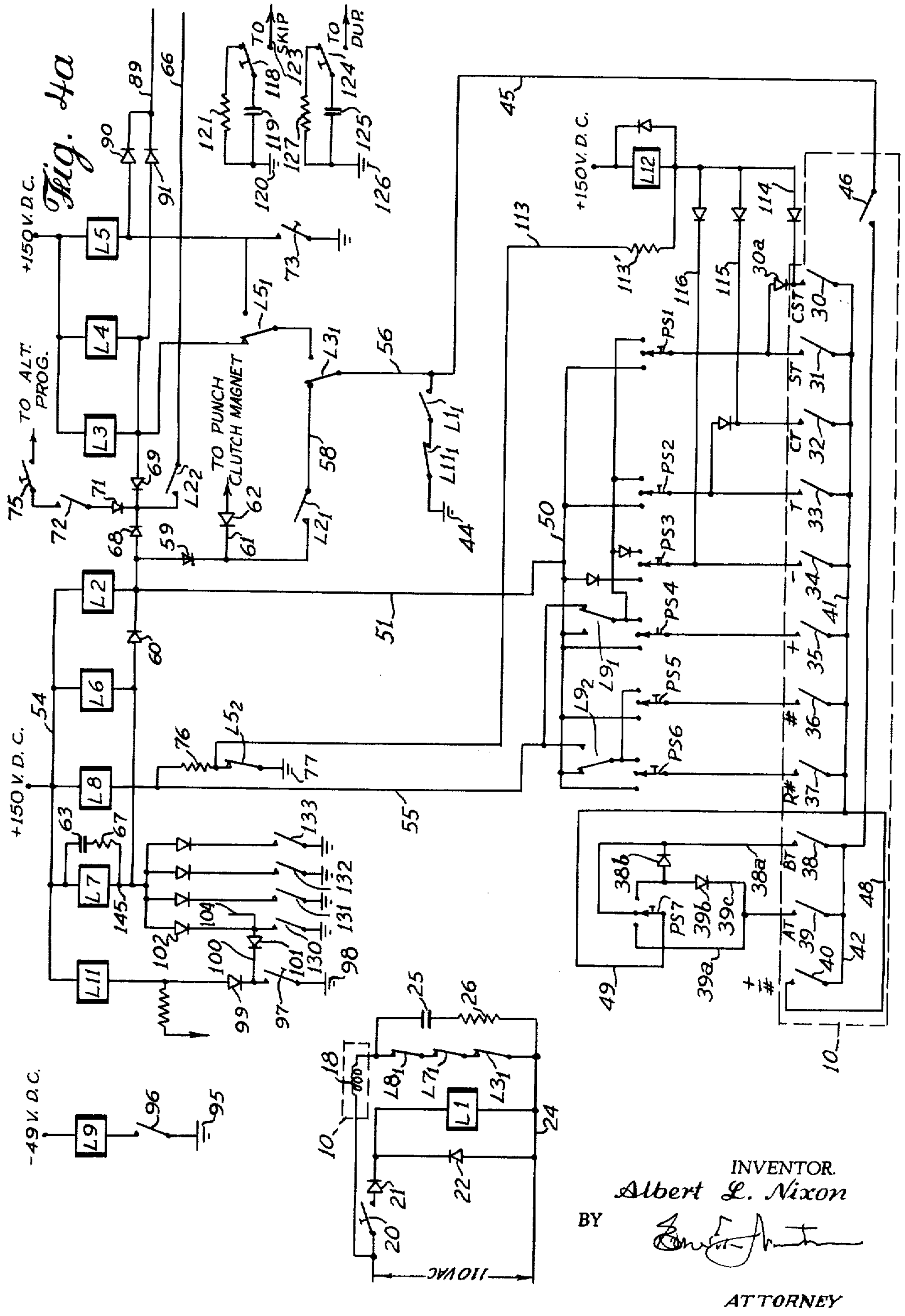

FIG. 4*a* is a schematic wiring diagram showing a portion of the wiring and components of the data coupler shown in FIG. 1 and so much of the circuitry of the adder shown in FIG. 1 and the keypunch shown in FIG. 1 as is necessary to illustrate the conecting of the data coupler to the adder and keypunch.

Figure 4B:
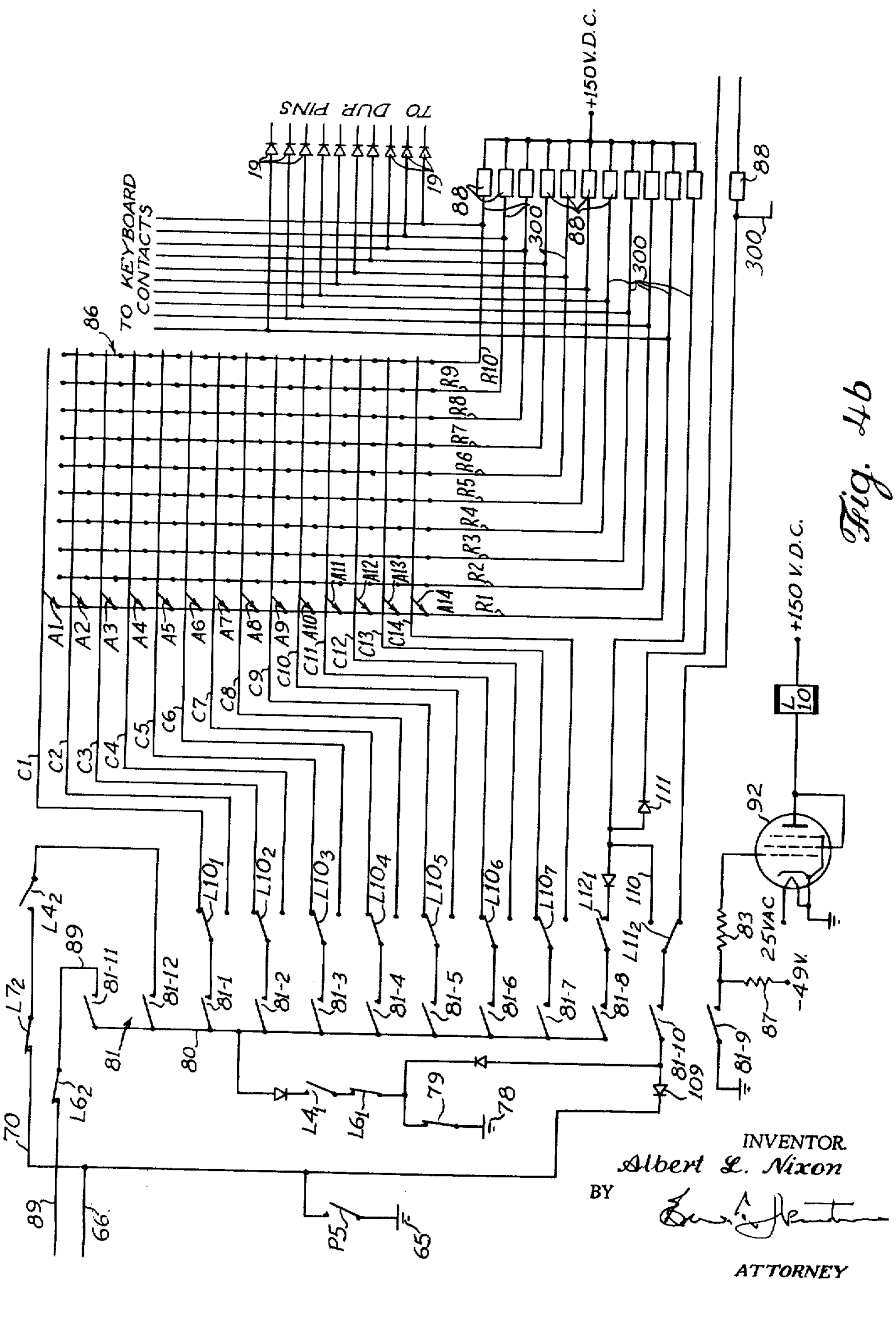

FIG. 4*b* is a schematic wiring diagram showing the remaining parts of the circuit illustrated in FIG. 4*a*.

Referring now in detail to the embodiment chosen for the purpose of illustrating the present invention, it being understood that, in its broader aspects, the present invention is not limited to the exact details herein depicted, numeral 10 denotes generally the conventional adder or adding machine, seen best in FIG. 1, which is connected by a cable 11 to the data coupler 12. A cable 14 leads from the data coupler 12 to a conventional keypunch or card punching machine 15 which processes successively a plurality of cards, such as card 9.

When the data coupler 12 and keypunch 15 are programmed properly, successive entries are made into the adder 10 by sequentially depressing selected keys 16 and then the motor bar 17 of the adder 10 in the customary way. This, of course, causes the adder 10, in most instances, to transcribe the entries in one or a plurality of columns on tape or sheets in the adder 10. It will be realized that some adders 10 will have a separate motor bar; whereas, other adders will use the numbered keys to cycle the machine. The term motor bar includes any means used to cycle the machine so that the digits selected will be entered into the machine.

Figure 2:
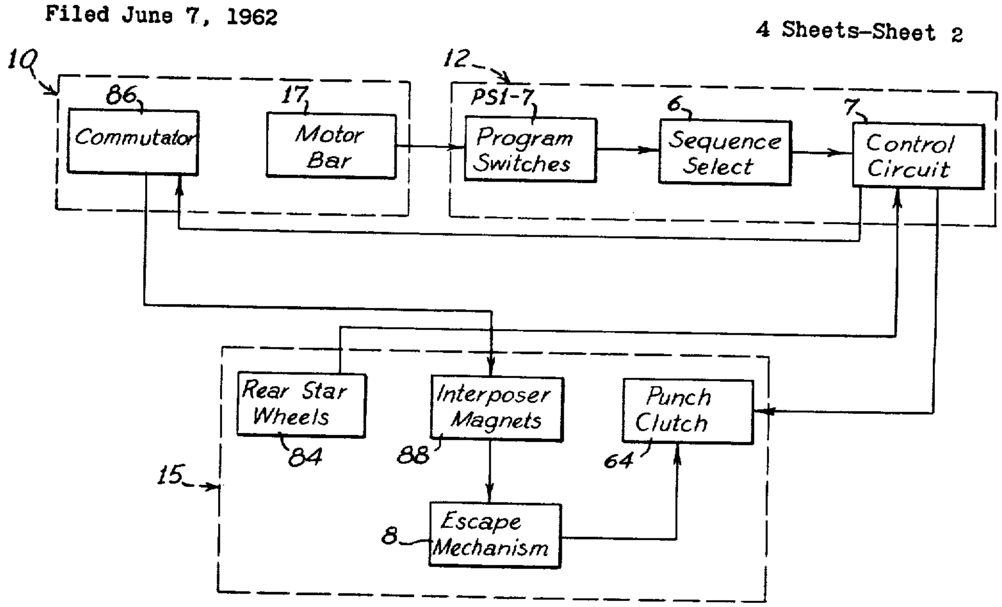
FIG. 2 is a block diagram illustrating the operation of the device shown in FIG. 1.

As seen in FIG. 2, the signal from the motor bar 17 is fed through the program switches PS1–PS7 of the coupler 12, the position of program switches PS1–PS7 determining the proper channels for the signal. The signal then goes through the sequence selector 6 to the control circuit 7. The control circuit 7 first cycles the punch clutch 64 in the key punch 15 one time. If the programming switches are in the select position, the signals from the sequence selector 6 and from the rear program drum 84 are fed into the control circuit 7, which sends a signal to the commutator 86 in the adder 10. The commutator 86 then selectively sends signals to the interposer magnets 88 which act through the escape mechanism 8 to cycle the punch clutch 64; the punch clutch 64, in turn, causing the cards 9 to be punched. If the programming switches are not in the select position, the sequence selector will not be in the operation above described.

A more thorough understanding of the circuit from the interposer magnets 88 to the punch clutch 64 may be had by reference to IBM Customer Engineering Manual of Instruction, copyright 1961 by International Business Machine Corporation, page 23.

Attention is now directed to FIGS. 4*a* and 4*b* which show a schematic wiring diagram of the circuit. The keypunch 15 here shown and described is an IBM 024 or IBM 026; and, the adder 10 here shown and described is the National Cash Register 160. The circuit is shown with the relay coils and their associated switches separated for simplicity and clarity, as is common in the art, the switches being shown in their normal positions. It will be understood that in the drawings there are a number of relays, each having a coil which controls one or a plurality of switches. Therefore, I have designated a coil of a particular relay by the letter L and a number. I have designated the switches which are controlled by that coil by the letter L and the number designation of the controlling coil, followed by a suffix. Thus, coil L10 controls the switches $L10_1$, $L10_2$, $L10_3$ etc.

In FIG. 4*a* of the drawings, it will be seen that a manual on-off switch 20 is in the line leading from a voltage source of 110 v. A.C. which is a standard voltage in the adder 10. The relay coil L1 is in parallel with the voltage supply, and in series with a diode 21 which gives a half-wave rectification of the alternating current. A second diode 22 is in parallel with the relay coil L1 and is oriented so that the back e.m.f. due to the collapse of the magnetic field in the relay coil L1 will flow in the same direction as the current flowing through the half-wave rectifier, i.e., diode 21. It will thus be seen that the back e.m.f. due to the collapsing magnetic field will hold the relay of coil L1 for a short while. The extra holding time is sufficient to prevent chattering of the relay of coil L1 due to the pulsating current caused by the half-wave rectifier.

The "on-off" switch 20 allows the operation of the entire control circuit, which is to be described hereafter. It is only through the control circuit that the adder 10 and the keypunch 15 are interconnected; therefore, when the switch 20 is "off," the adder and/or keypunch may be operated individually, neither affecting the other in any way.

An adder such as adder 10 is normally provided with a solenoid operated locking means which locks the keyboard while the adder is cycling. When the trip solenoid, such as solenoid 18, is energized, the motor bar 17 is free; when the trip solenoid is deenergized, the motor bar 17 is locked. In adder 10 the trip solenoid 18 is energized through the wire 24 of the circuit here considered. Leading from the wire 24 is a plurality of relay switches $L3_1$, $L7_1$, and $L8_1$, all in series, and all normally closed. A capacitor 25 and resistor 26 are in series, and are in parallel across the three relay switches $L3_1$, $L7_1$ and $L8_1$ for arc suppression.

The programming of the present invention is accomplished, in part, by the manipulation of switches PS1, PS2, PS3, PS4, PS5, PS6 and PS7 carried by the panel of coupler 12 and referred to collectively as switches PS1–7. Switches PS1–7 are the first poles of double pole triple throw-switches, the other or second poles of which are designated hereinafter as PS1′, PS2′, PS3′, PS4′ and PS5′.

The common poles of switches PS1–7 are connected through function designating switches 31 through 37, respectively, of adder 10 to a common bus 41 therein, the switches 31–37 being closed upon cycling of adder 10. In the adder 10 are additional function designating switches 30, 38 and 39, switch 30 being connected to bus 41 and via a diode 30*a* to the connection between switches PS1 and 31, and the switches 38 and 39 being respectively connected to a second bus 42.

The other side of switch 38 is connected, via wire 38*a*, to one point of switch PS7. The other side of switch 39 is connected, via wire 39*a*, to another point of switch PS7 and also, via diode 39*b* and wire 39*c*, to the remaining point of switch PS7. A diode 38*b* is connected between wires 38*a* and 39*c*.

The common point of switch PS7 is connected, via wire 49, to bus 41, while busses 41 and 42 are interconnected via wire 48 and switch 40. For grounding bus 42 through wire 46, wire 45 and series connected switches $L1_1$ and $L11_1$ lead to ground 44.

The points of switches 30–40 of the adder 10 are designated respectively CST, CT, T, −, +, #, R#, BT, AT and +−# to indicate the respective functions of their switches, CST meaning credit sub-total, CT meaning credit total, T meaning total, + meaning addition, − meaning subtraction, # meaning non-add, R# meaning red non-add, AT meaning a total in a column designated as the "A" register, and BT meaning a total in a column designated as the "B" register.

It will be seen that current may flow from ground 44, through the normally closed switch $L11_1$ via the switch $L1_1$, wire 45, switch 46, and thence to the wire 42. The switch 46 is the record switch in the adder 10 and is closed by the adder 10 when it is cycled by the depressing of motor bar 17. The switch $L1_1$ is closed when the coil L1 is energized by the above described circuit, upon the closing of on-off switch 20.

Thus, each time the adder is cycled, there is a circuit made from ground 44 to the wire 42. If the switch 40 is closed, the circuit will be completed through wire 48 to the wire 41, thus placing one side of all of switches 30–37 at ground potential. If one of the switches 38 or 39 is closed, the circuit will be completed through the switch PS7 and wire 49 to the wire 41, placing the wire 41 at ground potential.

The switches 30–40 are selectively closed by the adder 10 according to the function the machine is directed to carry out when selected keys are punched on the keyboard of the adder 10. If the function is add, non add, or subtract, the switch 40 is closed; if the function is to be a total, the appropriate switch 38 or 39 is closed, depending on whether it is to be an A total or a B total. The switches 30–37 are closed in accordance with the particular function selected. Thus, for any function of the adder 10, one of the switches 38–40 will be closed, and one of the switches 30–37 will be closed. The closing of one of the switches 30–37 while the wire 41 is at ground potential will, of course, place the common point of one of the switches PS1–PS6 at ground potential, since they are respectively in series with switches 31-37.

One point of each of the programming switches PS1–

PS6 is directly connected to a common bus 50; from bus 50, a wire 51 is connected to the coil L2 of a relay. The other side of the coil L2 is connected by wire 54 to a high potential, e.g. +150 v. D.C., which is the standard voltage in the keypunch 15. A second point of each of the programming switches PS1–PS4 is connected to the common point of relay switch $L9_1$; while, a second point of each of switches PS5 and PS6 is connected to the common point of relay switch $L9_2$. The normal point of switch $L9_1$ and the transfer point of switch $L9_2$ are connected by wire 55 to relay coil L8, the other side of which is connected to wire 54. The transfer point of switch $L9_1$ and the normal point of switch $L9_2$ are connected to the wire 50.

Leading from the wire 45 is a wire 56 to which is connected the common point of relay switch $L3_1$. From the normal point of switch $L3_1$ a wire 58 connects to relay switch $L2_1$ which is connected through a diode 59 to coil L2. Coils L6 and L7 are connected through a diode 60 to coil L2 so that when coil L2 is energized, coils L6 and L7 are also energized.

It will be understood that the selected switch of switches 30–40 remains closed until the motor bar 17 is depressed; also, the closing of switch 46 is for only a short duration. Therefore, when coil L2 is picked up or energized through wire 51, it would be deenergized or dropped if a holding circuit were not employed. The holding circuit is through the switches $L3_1$ and $L2_1$, so that the coil L2 is energized through its own contacts; and as long as coil L2 is energized coils L6 and L7 are also energized.

Between the switch $L2_1$ and the diode 59 and attached to wire 58 is a wire 61 which leads, through diode 62, to the punch clutch magnet 64*a* in the keypunch 15. This circuit will be understood by reference to FIG. 35 on page 23 of the publication above referred to.

When the punch clutch 64 is cycled, the cam operated switch P5 in FIG. 4*b* will be closed for a short time. A better understanding of the operation of switch P5 may be had by referring to page 20, FIG. 28 of the above identified publication, in which switches, such as switch P5, are designated as "Punch Circuit Breakers." With the closing of switch P5, current will flow from ground 65, through switch P5, via wire 66, switch $L2_2$, through diode 68, to the wire 51 to hold energized coils L2, L6 and L7 as previously described. The current will also pass through diode 69 to pick up or energize relay coils L3 and L4. The energizing of coil L3 shifts switch $L3_1$ to break the circuit through wire 58, contacts $L3_1$, contacts $L2_1$, diode 59 to relay coil L2. Since the relay coil L7 is energized, switch $L7_2$ is opened, thus preventing current from flowing through the wire 70.

The closing of switch P5 will also supply current through the diode 71 to the switch 72. The switch 72 is a switch on the adder 10 which is closed when the carriage C of adder 10 is in a certain position and the adder 10 is cycled with the carriage in that position. Switch 72 remains closed until the adder 10 is again cycled. Such switches are closed by form bar cams 74, as illustrated in FIG. 1, and is well known in the art. In series with the switch 72 is a manually operated switch 75 which connects to the alternate program circuit in the keypunch 15. Further details of the alternate program will be found on page 44 of the above cited reference. It will thus be seen that the momentary closing of switch P5 will activate the alternate program only if the switches 72 and 75 are closed.

The punch clutch 64 activation impulse above described was directly to the punch clutch magnet 64*a*, as seen in FIG. 1, and did not go through the escape magnet 8; therefore, the card 9 in the keypunch 15 would not be moved.

At the end of the impulse supplied by the momentary closing of switch P5, coils L2, L6 and L7 will be deenergized, the deenergizing being delayed by a capacitor 63 and resistor 67 across coil L7, and a diode 60. Coils L3 and L4, however, are held by the circuit from ground 44, via switches $L11_1$, $L1_1$, wire 56, switches $L3_1$ and $L5_1$. Now, a circuit is completed from ground 78 in FIG. 4*b*, through the switch 79, switch $L6_1$ (which is closed since relay coil L6 is deenergized), switch $L4_1$ (since relay coil L4 is energized), thence to the common bus 80 of the rear star wheels or program card readers 81, i.e. switches 81–1 through 81–12. Switch 79 is the keyboard restore contact found in the keyboard of keypunch 15 and is closed when the keypunch is not performing a function. It is, however, open when the keypunch 15 is being cycled.

It will be understood by those skilled in the art that keypunch machines, such as keypunch 15, are provided with program drums which carry punched cards thereon for the purpose of programming the machine. These punch cards are read by the usual star wheels or switches. The IBM 024 and 026 may be provided with two such drums, as seen in FIG. 1, one being referred to as the front drum 82, and the other being referred to as the rear drum 84. Such terminology will be used hereinafter, though it will be understood that any similar programming device may be used to achieve the same result.

Associated with the respective column keys 16 in adder 10 is the commutator 86 which includes a plurality of movable switches, designated switches A1 through A14, and indicating that adder 10 is a fourteen column machine. The commutator 86 is of usual construction having a grid including spaced parallel horizontal wires C1 through C14 to which the respective switches A1 through A14 are connected. The grid of commutator 86 also includes spaced parallel vertical wires R1 through R10.

To adapt the keypunch 15 for receivinng the impulse from wires R1–R10, the normal duplicating circuits to the respective interposer magnets 88 are cut on the ground side and diodes 19 are inserted therein so that the keypunch 15 may operate as usual but current flowing in an opposite direction from the normal direction in the interposer circuits of the keypunch 15 will be blocked. The wires R1–R10 are then connected to the wires 300 between the diodes 19 and the interposer magnets 88 so as to create respective circuits (to ground) via coupler 12 and adder 10, these circuits being in parallel with the circuits (to ground) of the interposer magnets 88 of keypunch 15. The impulses from wires R1–R10, however, are blocked by the diodes 19. There is also an eleventh interposer magnet 88 and its diode 19 which will be discussed hereinafter.

When a digit key, say a five, in, say, the third column of the adder 10 is depressed, this will move the switch A3 to a position to contact wire R5 in the group of vertical wires R1–R10, the wires R1–R10 being respectively connected to the interposer magnets 88 in the keypunch 15. Thus, a circuit is made between wire C3 and wire R5. Similar circuits may be made by depressing keys 16 in other columns of the keyboard of the adder 10, whereby a single numeral is put into the machine. When the motor bar 17 is depressed, the mechanism of the adder 10 records this particular number and the switches A1–A14 remain in this position until the adder 10 is cycled again for a new entry. An additional function, however, takes place according to the present invention.

It will be remembered that for the first cycle of the present machine, common bus 80 (connected to all star wheels 81) is grounded via ground 78. If the first column of adder 10 is to be read, then the second column etc., the programming card 85 on drum 84 will have a staggered column of holes therein which successively align with star wheels 81–1, 81–2, etc. With this particular program in card 85, in the first cycle an opening is aligned with switch 81–1, thereby closing it to make a circuit to ground from wire C1, via switch $L10_1$. If switch A1 is contacting wire R5 (because the appropriate key 16 in column one of the adder 10 has been punched), a circuit is thus made to the interposer magnet 88 of wire R5.

The energizing of any one of the interposer magnets 88 causes a number of usual functions to take place in the keypunch 15, as follows:

First, the card 9 is advanced and, thereafter, the punch clutch 64 is energized to cause card 9 to be punched by an appropriate punch (not shown) associated with the particular interposer magnet 88 which is energized at about the same time. The drums 82 and 84 are indexed, the indexing of card 85 moving a punched opening therein into alignment with star wheel 81–2. The cycling of the punch clutch 64 also cycles the switch P5.

On the second and subsequent cycles of the keypunch 15 in a single cycle of the adder 10, circuits are successively momentarily made from ground 65 to bus 80, via switches P5, $L7_2$, $L4_2$ and star wheel 81–12, thereby permitting circuits to be made successively to the interposer magnets 88 via the respective star wheels 81 and their respective switches A2, A3, etc. It will be appreciated that the punches in card 85 for star wheels 81–12 define the field of punching for each operation of the machine. In other words, the openings in card 85 for star wheel 81–12 determine the width of the particular punching field.

When the time arrives for switches A8 through A14 to be read, the drum 84 will have indexed card 85 to a position where an opening is in registry with star wheel 81–9. Star wheel or switch 81–9 is connected on one side to ground and on the other side between two resistors 83 and 87 in series with each other between the grid of a pentode 92 and a −49 v. D.C. source. The cathode of the pentode 92 is connected to ground while a plate thereof is connected to the positive voltage source through relay coil L10, the coil controlling switches $L10_1$ through $L10_7$. Thus, with switch 81–9 open, the bias on the grid of pentode 92 is sufficient to block the flow of current in pentode 92; however, when switch 81–9 is closed, the bias is altered sufficiently that current flows in the plate circuit to energize relay coil L10 which transfers its associated switches $L10_1$ through $L10_7$ so long as switch 81–9 remains closed. The pentode here used is a tube such as a 25L6. Though a triode may be used for the control above described, the pentode which has a suppressor grid is capable of delivering more power than a triode.

In the last column of the punching field of rear drum program card 85, there are punches in both rows 11 and 12. The final pulse of switch P5 will go through the star wheel 81–12 to punch the appropriate row as before; however, the current will also flow through star wheel 81–11 and via wire 89, and relay switch $L6_2$, through diode 90 to energize relay coil L5, and through diode 91 to hold or retain energized coils L4 and L3. At the end of the pulse from switch P5, the energizing current through star wheel 81–11 will be terminated; however, coil L5 will be held through the circuit from ground 44, switches $L11_1$, $L1_1$, wire 58, switches $L3_1$ and $L5_1$ which are in a transferred condition. Relay coils L3 and L4 will drop at the end of the pulse from switch P5; and, when coil L3 drops, the switch $L3_1$ will move to its normal position, breaking the circuit to coil L5. The purpose of holding coil L5 through the switch $L3_1$ is to assure that coil L3 will drop or deenergize before coil L5. The circuit is now ready to receive another entry through the adder 10.

*Sequence check*

To check the sequence, i.e., to assure that an add function is entered in an add field and a non-add function is entered in a non-add field, the relay coil L9 in FIG. 4*a* is used. Relay coil L9 is picked or energized through the number two star wheel, i.e. switch 96, on the front program drum 82 of the keypunch 15. If the star wheel or switch 96 reads a hole in the program card 83, the circuit will be completed from ground 95, through relay coil L9, to −49 volt potential. Energizing relay coil L9 transfers switches $L9_1$ and $L9_2$ so that a circuit is made from all second points of switches PS1–PS4 through the transfer point of switch $L9_1$ to wire 50 for energizing coil L2. Simultaneously therewith, a circuit is made from the second points of switches PS5 and PS6, being non add function switches, via the transfer point of switch $L9_2$ through wire 55 for energizing coil L8. Coil L8, when energized, opens switch $L8_1$, which locks the adder 10 to make the operator aware that something is wrong.

Conversely, if the star wheel 96 read a blank, coil L9 will not be energized and switches $L9_1$ and $L9_2$ will be in their normal positions, causing current from the second point of switches PS1–PS4 to be directed to wire 55 to energize relay coil L8 and lock the adder 10; whereas, current from the second points of switches PS5 and PS6 will flow to wire 50, via wire 41 to energize relay coil L2.

It is now seen that if say switch 35 were closed, indicating that an entry in the adder 10 is to be "added" and the program drum 82 were not so programmed, i.e.. switch 96 were open and hence coil L9 deenergized, a circuit would be made via switches PS4, $L9_1$ and wire 55 to energize coil L8 which would, in turn, lock the machine via switch $L8_1$, switch $L8_1$ opening the circuit to trip solenoid 18.

Once relay coil L8 is energized, the current flowing through relay coil L8, via resistor 76 and switch $L5_2$ to ground 77 in a hold-down circuit parallel to the energizing circuit therefor, is sufficient to maintain switch $L8_1$ open; that is, until the reset switch 73 is manually closed to energize relay L5 and thereby break this hold down circuit by opening switch $L5_2$.

The relays here used are so designed that they require at least 4.5 ma. of current to pick them; however, they can be held with only 2 ma. The circuit through ground 77, switch $L5_2$ and resistor 76 is normally closed, but the resistance is of such a value as to give between 2 and 4 ma. of current, which is enough to hold the relay once picked, but is insufficient to pick the relay.

*Error Indicator*

When an error is made in which the wrong hole or holes are punched in a card 9, a "reject" code may be punched by the operator in to that card 9. To accomplish this, the error switch 97, in FIG. 4*a*, is manually closed, which energizes relay coil L11 by completing the circuit from ground 98 via diode 99 and relay coil L11 to wire 54. At the same time, a circuit is completed through wire 100, diodes 101 and 102 to energize coil L7. The energizing of coil L7 opens switches $L7_1$ to break the circuit to solenoid 18 and to lock the adder 10 during the subsequent function of the keypunch 15. In energizing relay coil L7 through diode 101, the release circuit in the keypunch 15 is energized, the error circuit being connected by wire 104 to relay coil 105. Details of the release circuit will be found on page 42 of the reference book. Releasing the card 9 allows it to move past all the columns to the last column, or another previously programmed column. In the column designated, e.g. column 80, row 10 will be prepunched in the card 85 on the rear program drum 84 to be read by star wheel 81–10. Relay coil L11 is energized through switch 106 operated by the program cam 108. It will be recognized by those skilled in the art that in the keypunch the program cam control 106 actuates the standard release circuit in the keypunch 15.

Since the relay coil L11 has been energized by the error switch 97, relay switch $L11_2$ in FIG. 4*b* will be transferred; and, the cycling of the punch clutch 64 in the keypunch 15, which is concomitant with the releasing of the card, closes switch P5, giving a completed circuit through diode 109, star wheel 81, through the transfer point of switch $L11_2$, and the wire 110 to the appropriate interposer magnet 88, which will punch the "reject" code into the card 9.

It is now seen that the usual wiring of the keypunch 15 has been altered to the extent that all wires extending between the star wheels 81–1 through 81–11, and their respective interposer magnets 88, have been cut and that the relay switches $L10_1$ through $L10_7$ and the commutator 86 would have been wired therebetween, the star wheels 81–1 through 81–7 actuating, via the commutator 86, the first ten interposer magnets 88. Also, star wheels 81–8 and 81–10 are employed selectively to actuate the eleventh interposer magnet 88, while star wheel 81–9 is employed to energize relay coil L10. In a particular column, the eleven punch of card 9 indicates an "error"; in another column, it indicates a negative number, as will be pointed out hereinafter.

The diode 11 prevents the impulse through switch P5 from going through the circuit of the keypunch, but allows an impulse from the keypunch 15 to go to the interposer magnet 88, i.e. the eleventh interposer magnet 88.

*Negative number circuit*

A negative figure punched into a card 9 must have some code to identify it as a negative (or credit) figure The circuit here illustrated uses a row 11 or card 9 to designate credits. Referring to the programming switches, it will be seen that when any of the switches 30, 32 or 34 is closed to give, respectively, credit sub-total, credit total or minus, the relay coil L12 will be energized through one of wires 114, 115 or 116, respectively. Relay coil L12 is held through wire 113, and is dropped at the end of the punching field when relay coil L5 is energized. The resistor 113′ reduces the current through wire 113 so that the relay L12 can be held, but cannot be picked, as described above. Energizing of coil L12 will close the switch $L12_1$. In the columns of the card 85 which are programmed for negative numbers, row 8 will be punched; thus, the circuit will be complete through the star wheel 81–8 of switch $L12_1$ to the eleventh interposer magnet 88 to punch row 11 of the card 9.

Since the overpunching of an 11 to designate a negative number is dependent on having a row 8 punched in the program card 85, it will readily be seen that a negative may be designated in any column of a card. With this arrangement, it will be possible to punch, say, negative entries in the first column of a field, credit totals in the last column of a field, and credit sub-totals in a middle column. Thus, the cards may be sorted to separate any particular kind of negative entry rather than having all negative entries grouped together.

The simplicity of programming also allows a card to be punched in which all negative entries are punched as positive entries. This procedure is desirable in such cases as when the entire card will be negative, hence requires no particular designation for each series of digits.

*Skip circuit*

At times, it is desirable to skip a field of the card being punched. A skip circuit is built into the keypunch 15, as described on page 39 of the reference book. In the conventional machine a skip must be programmed in the program card 85, and requires the energizing of the appropriate circuit of the keypunch 15 for a very short time. To accomplish this manually, according to the present invention, a skip switch 118 is provided which has the common point connected to a capacitor 119, the other side of the capacitor 119 being grounded at 120. A resistor 121 is connected between ground 120 and the normal point of switch 118 so as to be in parallel with the capacitor 119 when switch 118 is in its normal position. The transfer point of the switch 118 is connected by wire 123 to the existing skip circuit of the keypunch 15, as represented by relay 122 in FIG. 1.

With this arrangement, it will be seen that, upon manual transfer of the switch 118, a circuit for charging the capacitor 119 will be completed. The capacitor 119 is of a size sufficient that impulse for charging it is of short duration and will actuate the skip circuit only once before the capacitor 119 is fully charged. Though the size of the capacitor 119 will vary for different machines, it has been found that a capacitor 119 rated at 2 mfd. works well with the equipment here described.

When the switch 118 is released to resume its nornal position, the resistor 121 will be short-circuited to discharge capacitor 119. A 1000 ohm. resistor 121 is used to prevent too high a current through the switch points.

*Duplicator circuit*

In the present invention, a manual duplicator circuit is also provided and operates exactly as does the skip circuit just described. For this duplicator circuit a capacitor 125, grounded at 126, is disposed in parallel with a resistor 127 through the normal point of a switch 124, the transfer point of which is connected by wire 128 to the existing duplicator circuit in the keypunch 15. Relay 129 represents the duplicator circuit of keypunch 15.

*Lock circuit*

The present circuit also includes means by which the adder 10 is locked so that no entries may be made during the time the keypunch 15 is carrying out a function. When the keypunch 15 releases a card 9, a switch 130 is closed by relay 105, which in turn energizes relay coil L7, thus opening switch $L7_1$ to lock the adder 10. Similarly, for a "skip" of card 9, coil 122 would be energized to close switch 131; for a "duplicate," coil 129 would be energized to close switch 132. Furthermore, for indicating "out of cards," the relay 134 would be deenergized to close switch 133. With any one of switches 130–133 closed, coil L7 is energized to lock adder 10.

*Indicator light circuit*

Referring now to FIG. 3*a* of the drawings, which shows the circuit for the indicator lights, it will be seen that triple throw switches are provided to select between one of a pair of lights. In this circuit, the switches PS1′, PS2′, PS3′, PS4′ and PS5′ are ganged with the programming switches PS1, PS2, PS3, PS4 and PS5 respectively, as previously mentioned. The common points of the switches PS1′, PS2′, PS3′, PS4′ and PS5′ are connected through a common wire 135 to ground 136. Lights 200 through 209 are connected respectively between the other points of the switches PS1′ through PS5′ through resistors 210 to a high potential bus 211 having a +150 v. D.C. voltage, so that if a switch is moved to the left (as seen in FIG. 3*a*) one light will be "on," and if moved to the right, the other light will be "on." In the center position of switches PS1′, PS2′, PS3′, PS4′ and PS5′, both lights connected thereto will be "off." It will be understood that the switch positions PS1′–PS5′ correspond, of course, with the positions of the switches PS1–PS5.

Also connected to the wire 135 is relay switch $L8_2$ in series with light 138 and resistor 210 to wire 211. The light 138, therefore, is lighted when the relay coil L8 is energized, such as when a function is to be entered in the wrong field of a card 9, as described above.

The indicator lights 139 and 140 shown in FIG. 3*b* indicate whether or not the keypunch 15 is doing a punch function. The light 139 and its series resistor 239 are between points 141 and 144 and the light 139 is lighted when the punch is functioning; and, the light 140 and its series resistor 240 are between points 142 and 144 and the light 140 is lighted when the punch is not functioning, or is ready to acept a punch function. The point 141 is connected to +150 v. D.C., and the point 142 is grounded. The point 144 is connected to the relay coil L7 at the point 145, seen in FIG. 4*a*. Thus, when relay coil L7 is not energized, the point 145 is at a potential of +150 v. D.C.; and, when the relay coil L7 is energized, the point 145 is at ground potential. When the point 144 (FIG. 3*b*) is at +150 v. D.C., the potentials at point 141 and point 144 are the same, allowing no current to flow; whereas, the point 142 is at a potential of 150 volts below the point 144, causing a current to flow which lights the light 140. When the point 144 is at ground potential, there is no difference in potential between point 142 and point 144, but there is a 150 volt difference in potential between the point 141 and point 144, which causes a current to flow which lights the light 139. It will be remembered that the relay coil L7 is energized during only the first cycle by the current from switch P5, and is also energized through one of the switches 130, 131, 132 or 133 when the keypunch 15 is performing some other function.

It will thus be seen that, when the punch function light 139 is on, the circuit is in position for the keypunch to operate; therefore, if the device will not operate, and the light 139 is on, the trouble will be in the keypunch rather than in one of the other components. On the other hand, if the light 140 is on and the machine will not operate, the trouble is in the coupler 12 or adder 10.

It will be seen in FIG. 1 that the programming switches PS1–PS7 on the data coupler 12 are in easy reach of the adder 10 operator, in juxtaposition on the panel of coupler 12, and are associated with their indicator lights 200–209.

*Operation*

In operation, the coupler 12 is first programmed for the particular job to be done. This is done by installing punched cards 83 and 85 on the front and rear program drums 82 and 84 in keypunch 15. A typical program for the front program card 83 would be as follows:

Starwheel number:
- 12—used for field definition; in second through last column of each field
- 11—used for automatic skip
- 10—used for automatic duplication
- 1—used to show alpha field
- 2—used as sequence check, in first column of all amount fields when programming switches are in select position
- 3—used for print suppression
- 4–9—used for alternate program A typical program for the rear program card 85 would be as follows:

Starwheel number:
- 81–12—used for field definition; in second through last column of each field
- 81–11—used to show end of field, in last column of every field
- 81–10—used for "reject" code
- 81–1—used to read out row 1, or row 8 in combination with starwheel 81–9
- 81–2—used to read out row 2, or row 9 in combination with starwheel 81–9
- 81–3—used to read out row 3, or row 10 in combination with starwheel 81–9
- 81–4—used to read out row 4, or row 11 in combination with starwheel 81–9
- 81–5—used to read out row 5, or row 12 in combination with starwheel 81–9
- 81–6—used to read out row 6, or row 13 in combination with starwheel 81–9
- 81–7—used to read out row 7, or row 14 in combination with starwheel 81–9
- 81–8—used to overpunch 11 to show negative numbers
- 81–9—used in combination with starwheels 81–1 through 81–7 to read out rows 8–14

After the program cards 83 and 85 are installed, the programming switches PS1–PS7 must be set to punch the functions desired; then, the input is begun by depressing a number of keys 16 on the adder 10 and the motor bar 17. This causes the adder 10 to close record switch 46, and (say) switch 40, as well as (say) switch 35 for an add function. If the switch PS4 is on the left point in FIG. 4*a*, current will pass, via wires 50 and 51, to energize relay coil L2, regardless of field. If the switch PS4 is on the right hand contact, i.e., in the select position, current will go through switch $L9_1$. If star wheel 2 on the front drum 82 reads a blank, the switch $L9_1$ will be on the normal point, which will cause current to flow through wire 55 to energize coil L8, opening switch $L8_1$, which locks the machine. In such a case, the reset switch 83 must be closed manually to energize relay L5 and open contact $L5_2$ to drop relay coil L8. The deenergizing of coil L8 closes contact $L8_1$, which unlocks the adder 10.

On the other hand, if the star wheel 2 on the front drum 82 read a hole, the relay coil L9 will be energized, causing switch $L9_1$ to be transferred, sending current to wire 50, through wire 51 to energize relay coil L2, as well as to energize relay coils L6 and L7. The energizing of relay coil L7 opens switch $L7_1$, which locks the adder 10 and the energizing of coil L2 closes switch $L2_1$, which completes the hold circuit to relay coils L2, L6 and L7 and also cycles the punch clutch 64 through wire 61. The cycling of the punch clutch 64 closes switch P5, sending current through wire 66, switch $L2_2$ to hold relay coils L2, L6 and L7, and through diode 69 to energize relay coils L3 and L4. When coil L3 is energized, switch $L3_1$ is transferred, breaking the previously described hold circuit. The current from P5 will activate the alternate program if switches 72 and 75 are closed; however, if the alternate program has not been selected, relay coils L3 and L4 will be held through switches $L3_1$ and $L5_1$, while relay coils L2, L6 and L7 will be deenergized. Current will now flow from ground 78, through switches 79, $L6_1$ and $L4_1$ to the common bus 80 of the rear star wheels 81. One of the star wheels 81 (depending on the programming) will read a hole, allowing current to go through the appropriate star wheel 81 to one of switches $L10_1$–$L10_7$.

If a star wheel 81–9 reads a hole, the relay coil L10 will be energized, and the current through a star wheel 81 will flow through the transfer point of one of contacts $L10_1$–$L10_7$; but, if the star wheel 81–9 read a blank, the relay L10 will not be energized, and the current will flow through the normal point thereof.

With the selecting of certain digits of the adder 10, the switches A1–A14 of the commutator 86 will be positioned properly to give the digits in accordance with the keys 16 depressed. The current from one of the switches $L10_1$–$L10_7$ will be fed in through one of the wires C1–C14, through appropriate switches A1–A14, and out one of lines R1–R10 to pick the proper interposer magnet 88.

When an interposer magnet 88 is energized, the keypunch 15 will move the card 9 ahead to the next column, and will cycle the punch clutch 64. With the card 9 now in the second column of the punching field, the star wheel 81–12 will read a hole (see program for rear drum program card 85), and some other star wheel 81 will read a hole. This allows current to flow from switch P5, through wire 70, contact $L7_2$, contact $L4_2$, star wheel 81–12 to the common bus 80, and out one of star wheels 81–1 through 81–7, again going through one of switches $L10_1$ through $L10_7$, through the commutator 86 and to the appropriate interposer magnet 88. The operation will continue throughout the punching field of card 85 until, in the last column of the punching field star wheel 81–11 detects a hole and hence makes a circuit via wire 89 to energize relay coil L5 and to hold relay coils L3 and L4. At the end of the impulse from switch P5, relay coils L3 and L4 will be dropped. Coil L5, however, will hold through switches $L3_1$ and $L5_1$ until coil L3 is dropped, thus assuring that coil L3 is deenergized before coil L5. When coil $L4_1$ is opened, the cycle may then be repeated by depressing additional keys 16 and the motor bar 17.

When any other function is selected on the adder 10, the operation will be the same as that described with the exception of punching a negative number. The negative numbers include the functions of subtract, credit total and credit sub-total. In the case of any of these, the relay coil L12 will be energized in addition to the above described procedure. The energizing of coil L12 causes switch $L12_1$ to close to punch an 11, as previously described.

If, at the option of the operator, one or more fields are to be skipped, the operator depresses the skip switch 118, once for each field to be skipped. The operation of this circuit has been described above.

Occasionally, the operator may make an error in, say, the sixth field of the card 9. Rather than repunch the entire five fields which are done correctly, the manual duplicator switch 124 is depressed five times, once for each field to be duplicated. This permits the information from the erroneous card 9 to be transcribed onto a subsequent card 9.

In positioning the programming switches PS1–PS6, the switches PS1′–PS6′ are also positioned, thus actuating particular ones of indicator lights 200–209. Since the panel shown in FIG. 1 is in clear view, the program set up may be easily checked from a distance, as by a supervisor. Hence, one person may stand at a distance and oversee several operators and their respective machines.

It will thus be seen that the present invention provides means by which an adder can be coupled with a keypunch so that the keypunch can be effectively controlled by the adder. The device of the present invention also provides means for programming so that each new job may be programmed by the operator rather than requiring skilled personnel. Indicator lights on the coupler 12 show the program set up, as well as indicating certain trouble due to incorrect operation.

Though particular equipment has been shown and described in connection with the coupler 12, it will be understood that any comparable equipment may be used in its stead. Also, the coupler 12 here shown is by way of illustration only, and is meant to be in no way restrictive; therefore, numerous changes and modifications may be made, and the full use of equivalents resorted to without departing from the spirit or scope of the invention as outlined by the appended claims.

I claim:

1. In a machine of the type wherein a wired adding machine controls a card punching machine to determine the holes to be punched by said card punching machine into a data card carried therein, said adding machine being characterized by a commutator including a plurality of commutator switches for interconnecting any one of a plurality of first wires with any one of a plurality of second wires, a keyboard having a plurality of keys, certain of said keys controlling certain of said commutator switches, and a plurality of function control switches, certain other of said keys controlling said function switches, said card punching machine being characterized by a program drum adapted to receive a prepunched program card thereon, a plurality of star wheel switches associated with said drum for actuation in response to the punches in said program card, a source of current, a plurality of interposer magnets for prescribing the punching of said data card by said card punching machine, the combination therewith of first circuits connecting said interposer magnets to said first wires of said commutator, second circuits connecting said second wires of said commutator to said star wheel switches, third circuits connected to said star wheel switches, said interposer magnets and said third circuits being connected to said source of current, relay switch means in said third circuits, relay coil means for controlling said relay switch means, a plurality of programming switches connected in series with said function control switches, said program control switches and said function control switches being connected to said relay coils across said source of current for selectively energizing said coils to actuate said relay switches.

2. In a machine of the type wherein a wired adding machine controls a card punching machine to determine the holes to be punched by said card punching machine into a data card carried therein, said adding machine being characterized by a commutator including plurality of commutator switches for interconnecting any one of a plurality of first wires with any one of a plurality of second wires, a keyboard having a plurality of keys, certain of said keys controlling certain of said commutator switches, and a plurality of function control switches, certain other of said keys controlling said function switches, said card punching machine being characterized by a program drum adapted to receive a prepunched program card thereon, a plurality of star wheel switches associated with said drum for actuation in response to the punches in said program card, a source of current, a plurality of interposer magnets for prescribing the punching of said data card by said card punching machine, the combination therewith of first circuits connecting said interposer magnets to said first wires of said commutator, second circuits connecting said second wires of said commutator to said star wheel switches, third circuits connected to said star wheel switches, said interposer magnets and said third circuits being connected to said source of current, relay switch means in said third circuits, relay coil means for controlling said relay switch means, a plurality of programming switches connected in series with said function control switches, said program control switches and said function control switches being connected to said relay coils across said source of current for selectively energizing said coils to actuate said relay switches, lock means on said adding machine, and a circuit from said function control switches and said program control switches for locking said adding machine when said function control switches and said program control switches are in prescribed conditions.

3. A machine of the class described comprising an adding machine of the type having a keyboard for actuating a plurality of commutator switches, a motor bar for closing a cycling switch to cycle the adding machine, function designating switches for determining the function of successive cycles of the adding machine, and a lock mechanism for locking the keyboard of the adding machine; a card punching machine of the type having interposer magnets for prescribing which holes are to be punched in a card; and a data coupler, said data coupler being characterized by relay means, a plurality of programming switches, a source of current, circuits from said source of current via said cycling switch, function designating switches and said commutator switches to said interposer magnets for selectively energizing said interposer magnets from said commutator switches when said motor bar is depressed and certain of the function designating switches and certain of the programming switches are in selected position to create a circuit to certain of said relay means, and a circuit from said source of current via the switch means of said relay means to said lock mechanism for locking said adding machine after said motor bar has been depressed, and a circuit energized after the first cycle of said card punching machine for supplying current via said commutator switches to said interposer magnets from said source of current, and means for unlocking said lock mechanism when said card punching machine has been cycled a prescribed number of times.

4. A machine of the class described comprising an adding machine of the type having a keyboard for actuating a plurality of commutator switches, a motor bar for closing a cycling switch to cycle the adding machine, function designating switches for determining the function of successive cycles of the adding machine, and a lock mechanism for locking the keyboard of the adding machine; a keypunch of the type having interposer magnets for prescribing which holes are to be punched by a punch means in a card, a plurality of starwheel switches, program means for closing said starwheel switch, said starwheel switches being connected to a common bus, and means for cycling said keypunch to index said program means and actuate said punch means; a data coupler, said data coupler being characterized by relay means, a plurality of programming switches, a plurality of indicator lights, said switches and lights being mounted in juxtaposition with respect to each other, a source of current, circuits from said source of current via said programming switches to said indicator lights for indicating the position of said programming switches, a circuit from one side of said source of current via said cycling switch and function designating switches to said common bus, a plurality of circuits from said starwheel switches to said commutator switches, a plurality of circuits from the other side of said source of current via said interposer magnets to said commutator switches for selectively energizing said interposer magnets from said commutator switches when certain of the function designating switches and certain of the programming switches are in selected position to create a circuit to certain of said relay means and certain of the keys of said keyboard are depressed, a bus energizing switch closed by said means for cycling said keypunch, a circuit from said one side of said source of current via said bus energizing switch to said bus, and a circuit from said source of current via the switch means of said relay means to said lock mechanism for locking said adding machine when said certain of relay means is energized.

5. The structure defined in claim 4 including means for unlocking said locking mechanism after said keypunch has cycled a prescribed number of times.

6. The structure defined in claim 5 including a relay having a coil and relay switches, said relay switch being connected in the circuits between said interposer magnets and said commutator switches, and means for energizing said coil to throw said relay switches and connect said commutator switches to said interposer magnets in a different manner, said last mentioned means including a circuit from one of said starwheel switches via said coil to said other side of said source of current.

7. The structure defined in claim 6 including a duplicating circuit for causing said key punch to duplicate in a card the punches in a column in another card, and means for manually actuating said duplicating circuits.

8. The structure defined in claim 7 including an error circuit for actuating an error punch in said key punch, and means for manually actuating said error circuit.

9. In a machine of the class described wherein an adding machine having a keyboard controls the operation of a card punching machine, said adding machine incidentally including function designating switches for determining the function of successive cycles of said adding machine and a lock mechanism which prevents the actuation of said keyboard, the combination therewith of a data coupler between said adding machine and said card punching machine, said data coupler having programming switches and a pair of relays, and a source of current, said function designating switches being respectively in series with said programming switches to form pairs of switches, each pair of switches being in parallel with each other and connectable by said programming switches across said source of current with either of the coils of said relays, the switch of one of said relays being operably connected to said lock mechanism for locking the same when actuated by its associated coil, the switch of the other of said relays being operably connected to said card punching machine for permitting a card punching operation to take place in said card punching machine when said adding machine is cycled.

10. A machine of the class described having an adding machine including a plurality of commutator switches, a cycling switch to cycle the adding machine, a plurality of function designating switches for determining the function of successive cycles of the adding machine, and a lock mechanism for locking the keyboard of the adding machine; a key punching machine of the type having interposer magnets for prescribing which holes are to be punched in a card; and, a data coupler having a plurality of manually actuated programming switches, each of said programming switches having two positions, one of said programming switches being connected in series with each of said function designating switches, first circuit means connecting one position of said two positions of said programming switches to said interposer magnets, second circuit means connecting the other position of said two positions of said programming switches to said lock mechanism, the arrangement being such that a current passing through a function designating switch and through said one position of said two positions of said programming switches will energize certain of said interposer magnets, and a current passing through a function designating switch and through the other position of said two positions of said programming switch will activate said lock mechanism.

References Cited by the Examiner

UNITED STATES PATENTS

| | | | |
|---|---|---|---|
| 2,318,299 | 5/43 | Doty | 340—172.5 X |
| 3,105,636 | 10/63 | Green | 235—60.25 |

MALCOLM A. MORRISON, *Primary Examiner.*